(12) United States Patent
Bayer et al.

(10) Patent No.: US 6,414,863 B1
(45) Date of Patent: Jul. 2, 2002

(54) FREQUENCY CONTROL CIRCUIT FOR UNREGULATED INDUCTORLESS DC/DC CONVERTERS

(75) Inventors: Erich-Johann Bayer, Thonhausen; Hans Schmeller, Forstern, both of (DE)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/943,482

(22) Filed: Aug. 30, 2001

(51) Int. Cl.$^7$ .............................. H02M 3/18; H02M 7/00
(52) U.S. Cl. ...................... 363/60; 307/110; 323/288
(58) Field of Search ............................ 363/59, 60, 61; 307/109, 110; 323/228

(56) References Cited

U.S. PATENT DOCUMENTS

| | | | | |
|---|---|---|---|---|
| 5,159,543 A | * | 10/1992 | Yamawaki | 363/60 |
| 5,397,928 A | * | 3/1995 | Chan et al. | 307/109 |
| 6,020,781 A | * | 2/2000 | Fujioka | 327/541 |
| 6,049,201 A | * | 4/2000 | Feldtkeller | 323/288 |
| 6,107,862 A | * | 8/2000 | Mukainakano et al. | 327/536 |

* cited by examiner

Primary Examiner—Bao Q. Vu
(74) Attorney, Agent, or Firm—J. Dennis Moore; W. James Brady, III; Frederick J. Telecky, Jr.

(57) ABSTRACT

An unregulated inductorless direct current to direct current converter comprising a first voltage-to-current converter configured to convert a first voltage to a first current and a second voltage-to-current converter configured to convert a second voltage to a second current. A regulation circuit is coupled to the first and second voltage-to-current converters and configured to generate an output current proportional to the difference between the first and second currents. Also a variable frequency oscillator is coupled to the regulation circuit, the oscillator receiving as a control current the output current therefrom and outputting a clock signal having a frequency proportionate to the control current. The converter further comprises an output stage coupled to receive the clock signal and receiving an input voltage and outputting an output voltage, the output voltage and the input voltage having a ratio that is determined by the clock signal.

23 Claims, 2 Drawing Sheets

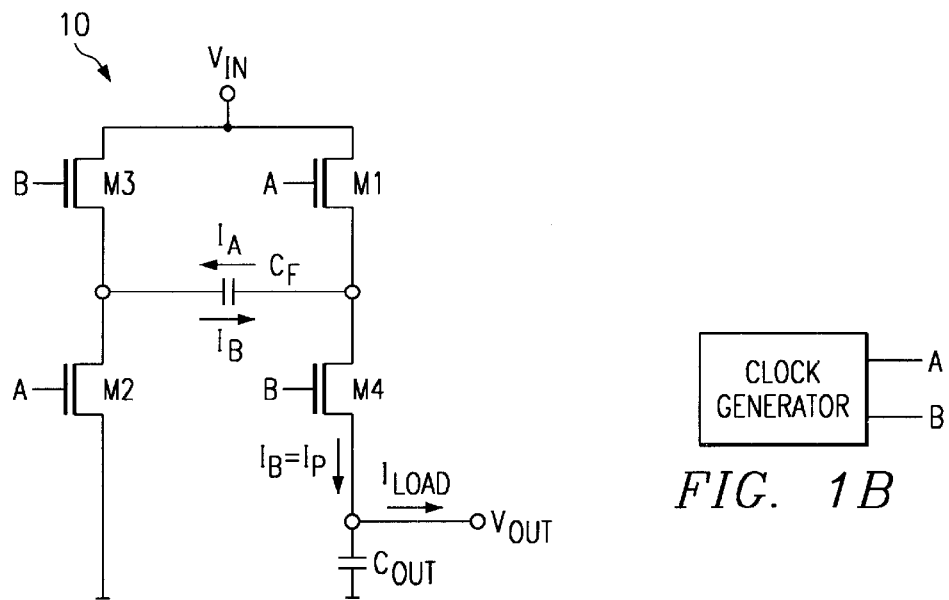
FIG. 1A
FIG. 1B
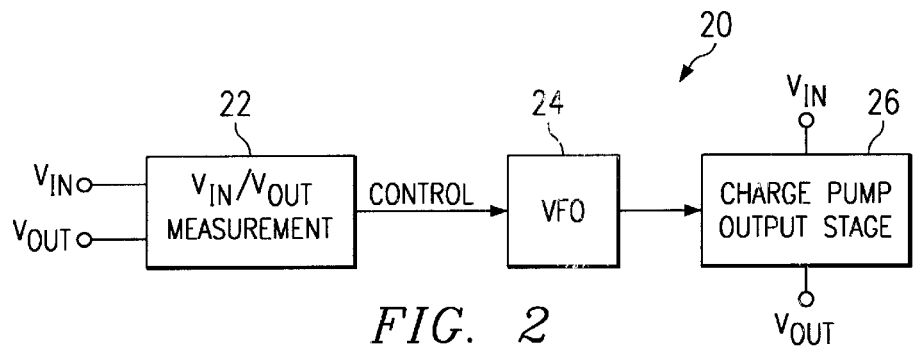
FIG. 2
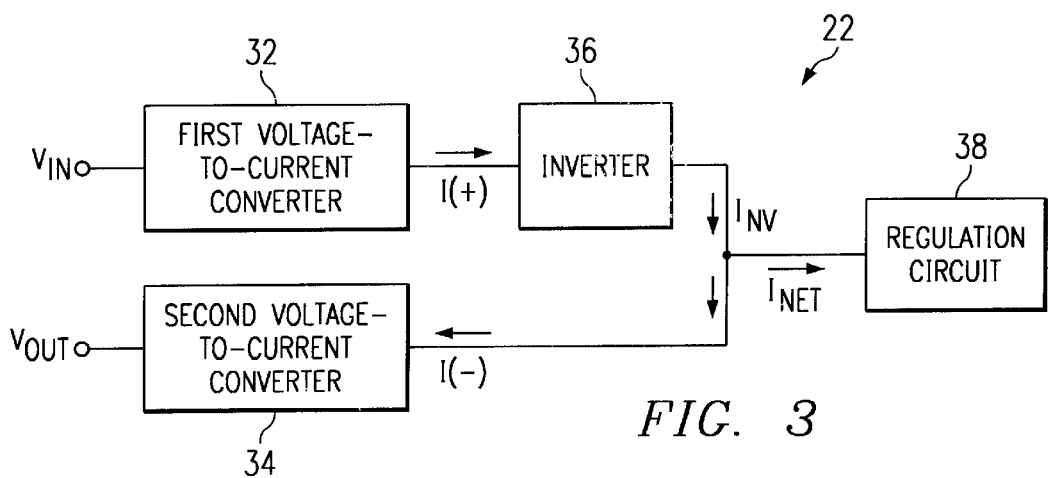
FIG. 3

FREQUENCY CONTROL CIRCUIT FOR UNREGULATED INDUCTORLESS DC/DC CONVERTERS

TECHNICAL FIELD OF THE INVENTION

This invention relates to DC/DC converters and more particularly to a frequency control circuit for regulation of an inductorless DC/DC converter.

BACKGROUND OF THE INVENTION

Unregulated inductorless DC/DC converters (i.e. charge pumps) are used to double, triple, or invert a voltage that is supplied to the converter. These converters, however, do not generate a constant output voltage. An exemplary unregulated converter comprises a clock generator or oscillator and an array of power switches. FIG. 1A, for example, shows a prior art unregulated voltage doubler 10. The voltage doubler 10 is coupled to a clock generator, as shown in FIG. 1B, which generates a signal A and B that serve as inputs into the voltage doubler 10. These signals will turn the multiple transistors M1, M2, M3, and M4 on as needed to double the voltage $V_{in}$. When transistors M2 and M1 are turned on (i.e. during phase A when the signal is high), the capacitor $C_f$ will be charged to the voltage $V_{in}$. When transistors M3 and M4 are turned on (i.e. during phase B when the signal is high), the capacitor $C_f$, which is already charged to the voltage $V_{in}$, will be put in series to the input voltage, $V_{in}$ and the output capacitor, $C_{out}$ will be charged up to twice the voltage $V_{in}$.

In order for the converter to work most efficiently and to be cost effective, there are four independent requirements that must be met. These requirements include 1) a small internal resistance (i.e. a low voltage drop at full load), 2) a low output voltage ripple at full load, 3) a low quiescent current, and 4) small and inexpensive external components (i.e. capacitors). The internal resistance $R_{i2}$ of an inductorless transistor SC voltage doubler can be calculated as:

$$R_{i2} = \frac{1}{C_f * f_{clk}} + 2 * \sum_{i=1}^{4} R_{Mi} \qquad (1)$$

were $C_f$=pump or "flying" capacitor, $f_{clk}$=clock frequency, and $R_{Mi}$=ON-resistance of switch $M_i$. Thus, to minimize the internal resistance $R_{i2}$, a high clock frequency $f_{clk}$ and/or a large flying capacitor $C_f$ is needed. The output voltage ripple is represented by:

$$V_{RIPPLE} = \frac{1}{2 * C_{OUT} * f_{clk}} * I_{LOAD} \qquad (2)$$

where $V_{RIPPLE}$=ouput voltage ripple, $C_{OUT}$=output capacitance, and $I_{LOAD}$=load current. To minimize the output voltage ripple, then, a high clock frequency and/or a large output capacitance is needed.

Since the Power MOSFETS in the converter periodically have to change states, their gates periodically need to be charged and discharged. The gates of all power transistors in the converter can be seen as a capacitor which needs to be charged to the input voltage and discharged to ground. When a capacitor is charged from zero to any other voltage, half of the energy gets lost. Compared to an inductive converter, a Charge Pump has higher switching losses from the gate capacitances of the power transistors, since there are more transistors to control. These losses are represented by a quiescent current:

$$I_Q = (V_{IN} * f_{clk}) * \sum_{i=1}^{4} C_{Mi} \qquad (3)$$

To minimize the quiescent current, a low clock frequency is need. However, the low clock frequency needed to minimize the quiescent current is counter to the high clock frequency which is needed to minimize the internal resistance and the voltage ripple. Thus, it is impossible for the prior art to fulfill all four requirements because prior art devices run at a constant frequency.

In the prior art, designers have generally compromised on the conflicting performance characteristics and offered their devices with different operating frequencies, for example 1, 10, 50, and 100 khz. Thus, consumers must choose to fulfill certain of the requirements while forfeiting others. For example, consumers can typically obtain the first three requirements but at the expense of very costly, large external capacitors which allow a small operating frequency. If the quiescent current $I_Q$ is not an issue, then high frequency versions with small external capacitors can be utilized. If internal resistance and voltage ripple is not an issue, low frequency versions with small external capacitors can be used, an example of which is the MAX 828 or a like device. Thus, what is needed is a design that will provide efficient and cost effective operation by meeting all four of the requirements.

SUMMARY OF THE INVENTION

These and other problems are generally solved or circumvented, and technical advantages are generally achieved, by the present invention that is a frequency control circuit for unregulated inductorless DC/DC converters.

In a preferred embodiment method of the present invention, an unregulated inductorless direct current to direct current converter comprises a first voltage-to-current converter configured to convert a first voltage to a first current and a second voltage-to-current converter configured to convert a second voltage to a second current. A regulation circuit is coupled to the first and second voltage-to-current converters and configured to generate an output current proportional to the difference between the first and second currents. The unregulated inductorless direct current to direct current converter further comprises a variable frequency oscillator coupled to the regulation circuit, the oscillator receiving as a control current the output current therefrom and outputting a clock signal having a frequency proportionate to the control current; and an output stage coupled to receive the clock signal and receiving an input voltage and outputting an output voltage, the output voltage and the input voltage having a ratio that is determined by the clock signal.

One advantage of a preferred embodiment of the present invention is that it provides a variable frequency to provide for small internal resistance, low output voltage ripple and quiescent current while allowing for small external capacitors.

Another advantage of a preferred embodiment of the present invention is that it defines a frequency sweep range that increases efficiency and decreases power loss.

Yet another advantage of a preferred embodiment of the present invention is that it provides for a cost effective device by allowing for the use of cheaper external components.

A further advantage of a preferred embodiment of the present invention is that it can flexibly operate with a variety of external components.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the concepts and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying figures, in which:

FIGS. 1A–1B illustrate a prior art charge pump and its principle of operation;

FIG. 2 is a simple block diagram of the present invention;

FIG. 3 is a block diagram of a preferred embodiment of the present invention.

DETAILED DESCRIPTION OF THE PREFERRED EMBODIMENT

Figure 4:
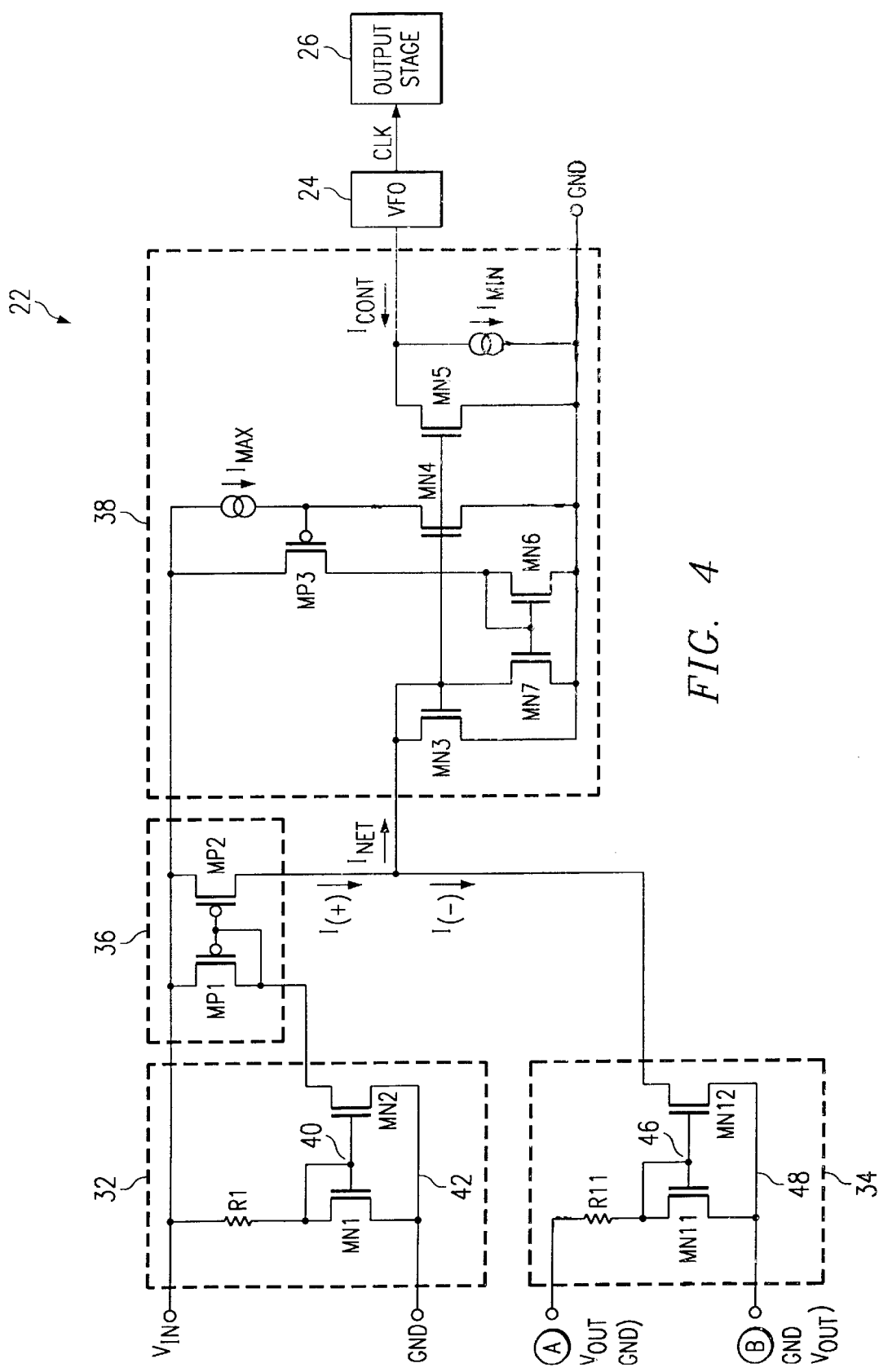
FIG. 4 is a schematic of a preferred embodiment of the present invention.

The making and using of the presently preferred embodiment is discussed in detail below. It should be appreciated, however, that the present invention provides many applicable inventive concepts that can be embodied in a wide variety of specific contexts. The specific embodiments discussed are merely illustrative and do not limit the scope of the invention.

FIG. 2 is a simple block diagram of an inductorless DC/DC converter 20 implementing a frequency control circuit of the present invention. The converter 20 includes a frequency control circuit 22 coupled to a variable frequency oscillator (VFO) 24 to control the frequency of a charge pump output stage 26. The frequency control circuit 22 measures an input voltage $V_{in}$ and output voltage $V_{out}$ from the charge pump output stage 26 and controls the frequency of the oscillator 24 utilizing the ratio of the input voltage $V_{in}$ to the output voltage $V_{out}$.

FIG. 3 is a block diagram of a preferred embodiment frequency control circuit 22 of the present invention. The frequency control circuit 22 comprises a first voltage-to-current converter 32 and a second voltage-to-current converter 34. An input voltage $V_{in}$ and output voltage $V_{out}$ of the charge pump output stage 26 are input into the first and second voltage-to-current converters 32 and 34. The voltage-to-current converters 32 and 34 are matched, i.e. they are identical in structure and function in order to provide accurate measurement of the ratio between the input voltage $V_{in}$ and the output voltage $V_{out}$.

The input voltage $V_{in}$ is input into the first voltage-to-current converter 32 and the output voltage $V_{out}$ is input into the second voltage-to-current converter 34. The input and output voltages, $V_{in}$ and $V_{out}$, are converted to first and second currents $I_{(+)}$ and $I_{(-)}$, respectively, which are proportional in magnitude to their corresponding voltages. The first voltage-to-current converter 32, however, is connected to an inverter 36 that converts the first current $I_{(+)}$ to an inverted current $I_{INV}$. The first current $I_{(+)}$ is inverted because the converters 32 and 34 each produce sink currents that cannot be compared. The inverter 36, then, facilitates the production of the inverted current $I_{INV}$ (i.e. a source current) that can be compared to the second current $I_{(-)}$ (i.e. a sink current). The inverter 36 and second voltage-to-current converter 34 are coupled to a regulation circuit 38 that is in turn coupled to the VFO 24 (shown in FIG. 2).

The regulation circuit 38 measures the ratio between the input and output voltages $V_{in}$ and $V_{out}$, respectively, and varies the frequency of the VFO 24 to facilitate a small internal resistance, low output voltage ripple at full load, and low quiescent current while allowing the use of small and inexpensive external capacitors. At light loads, the magnitude of the output voltage is at or close to the magnitude of the input voltage. Since the load current is small there is no problem to run with a low frequency even with small external capacitors. As shown by equation (3), the quiescent current $I_Q$ would be minimal because of the low frequency. Also the voltage ripple is minimized, in view of equation (2), because the small load current offsets the low clock frequency and small output capacitance (produced by the small external capacitors). The resistance is not an issue because only a small percentage of voltage is lost since the load current is small and the product of load current and internal resistance is small as well.

However, when the load current increases, the output voltage tends to drop; thus the difference between the output voltage and input voltage increases as well. To compensate for this reduction in output voltage, the regulation circuit 38 signals the VFO 24 to run faster and thus run the output stage (i.e. converter) at an efficient level. At full load current the quiescent current is not an issue because it is just a small percentage of the load current and therefore generates only a small degradation of the efficiency. Thus the system runs with maximum frequency to guarantee a small internal resistance and a low output voltage ripple. The VFO 24 is coupled to an output stage that will provide the desired output as dictated by the application in which the device is used.

FIG. 4 is a schematic of a preferred embodiment of the present invention. The first voltage-to-current converter 32 comprises a first transistor MN1 and a second transistor MN2. The first and second transistors MN1, MN2 have gate nodes 40 that are coupled together and source nodes 42 that are tied to a ground node GND. The second transistor MN2 is coupled to the inverter 36, represented in this preferred embodiment as a current mirror comprising two PMOS transistors MP1 and MP2. A first resistor R1 is coupled between the first transistor MN1 and an input node 44 that receives the input voltage $V_{in}$.

The matched second voltage-to-current converter 34 comprises a third transistor MN11 and a fourth transistor MN12 having gate nodes 46 that are coupled together and source nodes 48 that are tied to the ground node GND. A second resistor R11 is coupled between the third transistor and the output node 50 that receives the output voltage $V_{out}$. The second resistor R11 is preferably matched in value to the first resistor R1. If, for example, first resistor R1 is smaller than second resistor R11, then second resistor R11 will produce an additional offset current which should not be generated when the input voltage is equal to the output voltage (i.e. there is no load current). The additional offset current will operate as a load current and cause the frequency control circuit 22 to operate improperly.

The inverter 36 produces the inverted current $I_{inv}$. The inverted current $I_{INV}$ and second current $I_{(-)}$ are summed to produce a net current $I_{net}$. Because the inverted current $I_{INV}$ and second current $I_{(-)}$ are of a magnitude that is proportional to their respective voltages, the net current $I_{net}$ is of a magnitude that represents the difference of the input and output voltages $V_{in}$ and $V_{out}$.

The net current is input into a preferred embodiment regulation circuit 38 that comprises multiple transistors, MN3–MN7 and MP3. The net current $I_{net}$ is formed on the drain of transistor MN3. The regulation circuit 38 further comprises current sources that represent a maximum current $I_{max}$ and a minimum current $I_{min}$ that will be provided to the VFO 24. The minimum and maximum currents $I_{min}$ and $I_{max}$ provide the frequency sweep range of the VFO 24 that allows the converter to run efficiently with decreased loss of energy. The frequency of the VFO 24 is limited to a minimum frequency where the input and output voltages $V_{in}$ and $V_{out}$ are equal, that is the net current $I_{net}$ is zero. If there was no designed minimum frequency, the VFO 24 would stop oscillating when the net current $I_{net}$ was zero. Current source 52 prevents this by supplying the minimum current $I_{min}$. The VFO 24 is also limited to a maximum frequency to prevent the VFO 24 from running at frequencies at which no benefits are gained in efficiency and energy is loss.

Transistor MN5 is coupled to transistor MN3 to form a current mirror. Transistor MN5 operates to add the net current $I_{net}$ to the minimum current $I_{min}$. The resulting current is the control current $I_{cont}$ that is provided to run the VFO 24 at a rate that is proportional in magnitude to the ratio of the input and output voltages $V_{in}$ and $V_{out}$. Transistor MN3 also forms a current mirror with transistor MN4. If transistors MN3 and MN4 are the same size, then the current on the drain of transistor MN4 is the same as that on transistor MN3. Thus, the net current $I_{net}$ is mirrored onto the drain of transistor MN4. The drain of transistor MN4 is coupled to the gate of transistor MP3 allowing the net current $I_{net}$ to be compared with the maximum current $I_{max}$. If the net current $I_{net}$ is bigger than the maximum current $I_{max}$, then the gate of transistor MP3 becomes negative with respect to its source, MP3 switches on and turns on transistor MN6 (i.e. forces current via transistor MN6). Transistor MN6 turns on transistor MN7 that in turn sinks a portion of the net current $I_{net}$ from transistor MN3 such that the addition of the net current $I_{net}$ and the minimum current $I_{min}$ never exceeds the maximum current $I_{max}$. In a preferred embodiment, the VFO 24 minimum frequency is 50 khz and maximum frequency is 500 khz.

Furthermore, the size of transistors MN3 and MN5 can be chosen to provide the necessary control loop sensitivity for the regulation circuit 38. If the VFO 24 sensitivity is not compatible with the sensitivity of the regulation circuit 38 (i.e. the VFO 24 can not detect the changes in control current produced by the regulation circuit 38), the net current can be amplified by a factor necessary to provide correct operation. For example, by choosing the size of transistor MN5 to be 5 times the size of MN3, then the sensitivity of the regulation circuit is increased by a factor of 5. Thus, the bigger the size of MN5, the smaller the output voltage drop you need for the same frequency modulation. However, caution must be taken in matching the voltage-to-current converters 32 and 34 to ensure that the sensitivity of the regulation circuit 38 is not bigger than a matching error, otherwise the frequency control circuit 22 will not operate correctly.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, manufacture, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An unregulated inductorless direct current to direct current converter comprising:

a first voltage-to-current converter configured to convert a first voltage to a first current;

a second voltage-to-current converter configured to convert a second voltage to a second current;

a regulation circuit coupled to the first and second voltage-to-current converters and configured to generate an output current proportional to the difference between the first and second currents;

a variable frequency oscillator coupled to the regulation circuit, the oscillator receiving as a control current the output current therefrom and outputting a clock signal having a frequency proportionate to the control current; and an output stage coupled to receive the clock signal and receiving an input voltage and outputting an output voltage, the output voltage and the input voltage having a ratio that is determined by the clock signal.

2. The converter of claim 1 wherein the first voltage is the input voltage of the output stage land the second voltage is output voltage of the output stage.

3. The converter of claim 1 wherein the first current is inverted before it is input into the regulation circuit.

4. The converter of claim 3 wherein the inverter comprises a current mirror.

5. The converter of claim 1 wherein the first voltage-to-current converter comprises:

a first transistor and a second transistor having gate nodes coupled together and source nodes tied to a ground node; and a resistor coupled between the first transistor and an input node that receives the input voltage;

whereby the first current is proportional in magnitude to the input voltage.

6. The converter of claim 5 wherein the second voltage-to-current converter comprises:

a third transistor and a fourth transistor having gate nodes coupled together and source nodes tied to a ground node; and a resistor coupled between the third transistor and an output node that receives the output voltage;

whereby the second current is proportional in magnitude to the output voltage.

7. The converter of claim 1 wherein the first and second voltage-to-current converters are matched converters.

8. The converter of claim 1 further comprising a maximum current source that generates a maximum current.

9. The converter of claim 8 further comprising a minimum current source that generates a minimum current.

10. The converter of claim 9 wherein the regulation circuit compares the maximum current and the control current which controls the frequency of the variable frequency oscillator to limit the control current to a value that is less than or equal to the maximum current but greater than the minimum current.

11. The converter of claim 1 wherein the regulation circuit comprises multiple transistors to control the sensitivity of the variable frequency oscillator.

12. The converter of claim 9 wherein the maximum and minimum currents define the frequency sweep range of the variable frequency oscillator.

13. A control circuit for a variable frequency oscillator comprising:

a first voltage-to-current converter configured to convert a first voltage to a first current;

a second voltage-to-current converter configured to convert a second voltage to a second current; and a regulation circuit coupled to the first and second voltage-to-current converters and configured to generate an output current proportional to the difference between the first and second currents.

14. The circuit of claim 13 wherein the first voltage-to-current converter comprises:

a first transistor and a second transistor having gate nodes coupled together and source nodes tied to a ground node; and a resistor coupled between the first transistor and an input node that receives the input voltage;

whereby the first current is proportional in magnitude of the input voltage.

15. The circuit of claim 13 wherein the second voltage-to-current converter comprises:

a third transistor and a fourth transistor having gate nodes coupled together and source nodes tied to a ground node; and a resistor coupled between the third transistor and an output node that receives the output voltage;

whereby the second current is proportional in magnitude to the output voltage.

16. The circuit of claim 13 wherein the first and second voltage-to-current converters are matched converters.

17. The circuit of claim 13 wherein the regulation circuit comprises multiple transistors to control the sensitivity of the variable frequency oscillator.

18. The circuit of claim 13 further comprising an inverter that inverts the first current before the first current is input into the regulation circuit.

19. The circuit of claim 18 wherein the inverter comprises a current mirror.

20. The circuit of claim 13 further comprising a maximum current source that generates a maximum current.

21. The circuit of claim 20 further comprising a minimum current source that generates a minimum current.

22. The converter of claim 21 wherein the regulation circuit compares the maximum current and the control current which controls the frequency of the variable frequency oscillator to limit the control current to a value that is less than or equal to the maximum current but greater than the minimum current.

23. The circuit of claim 21 wherein the maximum and minimum currents define the frequency sweep range of the variable frequency oscillator.

* * * * *